(12) United States Patent
Lal et al.

(10) Patent No.: US 8,712,343 B2
(45) Date of Patent: *Apr. 29, 2014

(54) TOPOLOGY ARRANGEMENT FOR ACHIEVING RELIABLE COMMUNICATION IN WIRELESS AUTOMOTIVE NETWORKS

(75) Inventors: Dhananjay Lal, Pittsburgh, PA (US); Vivek Jain, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 443 days.

This patent is subject to a terminal disclaimer.

(21) Appl. No.: 13/030,675

(22) Filed: Feb. 18, 2011

(65) Prior Publication Data

US 2011/0143790 A1    Jun. 16, 2011

Related U.S. Application Data

(63) Continuation of application No. 12/050,257, filed on Mar. 18, 2008, now Pat. No. 7,917,099.

(51) Int. Cl.
*H04B 1/034* (2006.01)
*H04W 16/14* (2009.01)
*H04W 4/04* (2009.01)

(52) U.S. Cl.
CPC ............... *H04W 16/14* (2013.01); *H04W 4/04* (2013.01)
USPC ............. 455/99; 455/431; 455/297; 455/98; 455/41.1; 455/41.2; 370/328; 370/390

(58) Field of Classification Search
CPC .................................................. H04W 16/14
USPC ................... 455/99, 431, 297, 98, 41.1, 41.2; 370/328, 390
See application file for complete search history.

(56) References Cited

U.S. PATENT DOCUMENTS 7,496,361 B1 * 2/2009 Mitchell et al. ............... 455/423
2004/0062224 A1    4/2004 Brownrigg et al.

OTHER PUBLICATIONS

Elbatt, Tamer, et al; "Potential for Intera-Vehicle Wireless Automotive Sensor Networks"; Sarnoff Symposium, 2006 IEEE; Mar. 27-28, 2006; Princeton, New Jersey ((4 pages).

* cited by examiner

*Primary Examiner* — Sanh Phu
(74) *Attorney, Agent, or Firm* — Maginot, Moore & Beck

(57) ABSTRACT

A wireless network arrangement includes a space having a hindrance to wireless communication. The hindrance includes a fixed barrier and/or a three-dimensional area for accommodating a moveable barrier. At least three wireless electronic nodes are wirelessly and communicatively coupled to each other. A broadcast range of the nodes is greater than a largest dimension of the enclosure. The hindrance is disposed between a first one of the nodes and a second one of the nodes. The at least three nodes are positioned within the enclosure such that a wireless signal communication path wirelessly and communicatively couples the first one of the nodes to the second one of the nodes. The communication path is non-intersecting with the hindrance. The communication path passes through at least a third one of the nodes. The communication path is formed exclusively of a plurality of joined linear segments. Opposite ends of each linear segment are disposed at corresponding ones of the nodes.

20 Claims, 5 Drawing Sheets

FIG. 2

TOPOLOGY ARRANGEMENT FOR ACHIEVING RELIABLE COMMUNICATION IN WIRELESS AUTOMOTIVE NETWORKS

CROSS-REFERENCE TO RELATED APPLICATIONS/INCORPORATION BY REFERENCE

This application is a continuation of U.S. patent application Ser. No. 12/050,257 entitled "TOPOLOGY ARRANGEMENT FOR ACHIEVING RELIABLE COMMUNICATION IN WIRELESS AUTOMOTIVE NETWORKS", filed Mar. 18, 2008, the complete subject matter of which is hereby incorporated herein by reference, in its entirety.

BACKGROUND OF THE INVENTION

1. Field of the Invention

The present invention relates to networking systems, and, more particularly, to wireless networking systems.

2. Description of the Related Art

A modern car has complex functionality and a network architecture that supports numerous functions. It has been projected that the electronics inside a car will increase from about twenty-five percent of the car's total cost currently to about forty percent of the car's total cost in the foreseeable future. The increase of electronics in a car will place demands of better and more sophisticated network structures. The degree of networked infrastructure in a car as well as the sophistication of the network is specific to the car manufacturer, make and model. While generalizations about the networking infrastructure of a car do not hold true, a high-end car usually has more than one wired network. Typically, a high-end car has a high bandwidth network for power-train, and a relatively lower bandwidth network for body control and comfort features at a minimum. Lower-end cars tend to have fewer networked features. Costs associated with networking a car are the costs of development and testing of a network architecture, layout and planning. Due to the high degree of reliability expected from automobiles and the associated design cost, manufacturers are extremely prudent in adding new features or altering the existing network architecture.

In recent years, wireless networks have received much attention in research and development from industry and academia. While the cost of radio frequency integrated circuits has been on the decline, the technology itself has attained a level of maturity. Currently, it is possible to build much lower cost wireless nodes that may be embedded in any environment, which was not possible just a few years ago. However, wireless networks have the disadvantage of not being able to reliably communicate in environments in which obstructions impede the wireless transmission of signals. Such obstructions are common within the passenger compartment of a vehicle in the form of seats, consoles and passengers, thereby making wireless networks generally impractical within automotive passenger compartments. More generally, wireless networks suffer from numerous performance disadvantages when compared with wired networks, such as multi-path fading and interference. Hence, the reliability of a wireless network is likely to be less than that of a wired network.

What is neither disclosed nor suggested by the prior art is an arrangement for a wireless network that can reliably operate within the passenger compartment of a vehicle.

SUMMARY OF THE INVENTION

The present invention may provide a wireless network for use in an automotive passenger compartment wherein the network includes at least one intermediate node that relays signals from a transmitter to a receiver. The intermediate node may be useful in configurations wherein the line of sight between the transmitter and receiver is physically blocked by a passenger or by some structure within the passenger compartment, such as a seat, which would result in unreliable signal transmission in the absence of the intermediate node(s). The one or more intermediate nodes may be positioned such that there is an unobstructed path from the transmitter, through the one or more intermediate nodes, and to the receiver.

The present invention may provide a method of placing wireless nodes in an automotive environment to produce desired levels of reliability. Particularly, the invention may provide a method of creating reliable wireless channels in a wireless automotive environment, such as a vehicle cabin. The present invention may define reliability metrics, a Bit Error Rate and a Packet Error Rate (BER-PER). These metrics' performance in a wired network may be matched by links in a wireless network according to the invention.

The invention comprises, in one form thereof, a wireless network arrangement including an enclosure having a hindrance to wireless communication. The hindrance includes a fixed barrier and/or a space for accommodating a moveable barrier. At least three wireless electronic nodes are wirelessly and communicatively coupled to each other. A broadcast range of the nodes is greater than a largest dimension of the enclosure. The hindrance is disposed between a first one of the nodes and a second one of the nodes. The at least three nodes are positioned within the enclosure such that a wireless signal communication path wirelessly and communicatively couples the first one of the nodes to the second one of the nodes. The communication path is non-intersecting with the hindrance. The communication path passes through at least a third one of the nodes. The communication path is formed exclusively of a plurality of joined linear segments. Opposite ends of each linear segment are disposed at corresponding ones of the nodes.

The invention comprises, in another form thereof, an automotive network arrangement including a vehicle body including a passenger compartment. A hindrance to wireless communication is disposed within the passenger compartment. The hindrance includes a fixed barrier and/or a space for accommodating a moveable barrier. At least three wireless electronic nodes are wirelessly and communicatively coupled to each other. A broadcast range of the nodes is greater than a largest dimension of the passenger compartment. The hindrance is disposed between a first one of the nodes and a second one of the nodes. The at least three nodes are positioned within the passenger compartment such that a wireless signal communication path wirelessly and communicatively couples the first node to the second node. The communication path is non-intersecting with the hindrance. The communication path passes through at least a third one of the nodes. The communication path is formed exclusively of a plurality of linear segments. Opposite ends of each linear segment are disposed at corresponding ones of the nodes.

The invention comprises, in yet another form thereof, an automotive network arrangement including a vehicle body having a roof and a passenger compartment disposed below the roof. A hindrance to wireless communication is disposed within the passenger compartment. The hindrance includes a seat disposed within the passenger compartment and/or a passenger-accommodating three-dimensional portion of space defined by the seat. At least three wireless electronic nodes are wirelessly and communicatively coupled to each other. A broadcast range of the nodes is greater than a largest dimension of the passenger compartment. The hindrance is disposed between a first one of the nodes and a second one of the nodes. The at least three nodes are positioned within the enclosure such that a wireless signal communication path wirelessly and communicatively couples the first node to the second node. The communication path is non-intersecting with the hindrance. The communication path passes through at least a third one of the nodes. The third node is attached to the roof of the vehicle body. The communication path is formed exclusively of a plurality of linear segments. Opposite ends of each linear segment are disposed at corresponding ones of the nodes.

An advantage of the present invention is that a wireless network may operate in a reliable fashion despite the presence of obstructions within an operating environment, such as an automotive passenger compartment.

Another advantage of the wireless network arrangement of the present invention is the ease and flexibility with which it can be deployed. Because there are no wires to create placement constraints on the wireless nodes, the wireless nodes can be installed in inaccessible areas, or inside rotating parts or chambers.

Yet another advantage of the wireless network arrangement of the present invention is that, in the absence of wires and connectors for wires, enhanced reliability can be achieved. Reliability may be particularly improved over applications where wiring is drawn to parts that experience mechanical movement.

Still another advantage of the present invention is that a wireless network is easier to repair than is a wired network.

A further advantage of the present invention is that the wireless nodes are networked together, rather than being isolated from other systems.

A still further advantage of the present invention is that the in-vehicle wireless network arrangement may perform a much greater variety of functions because there are no requirements for wiring. Numerous sensors and actuators may be wirelessly networked to communicate with each other and collectively deliver rich features and performance. For example, numerous temperature sensors may be deployed and wirelessly networked in the vehicle cabin to optimize climate control. Similarly, a button may be provided on the steering wheel to contact and command any body control feature in the car that is wirelessly networked.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
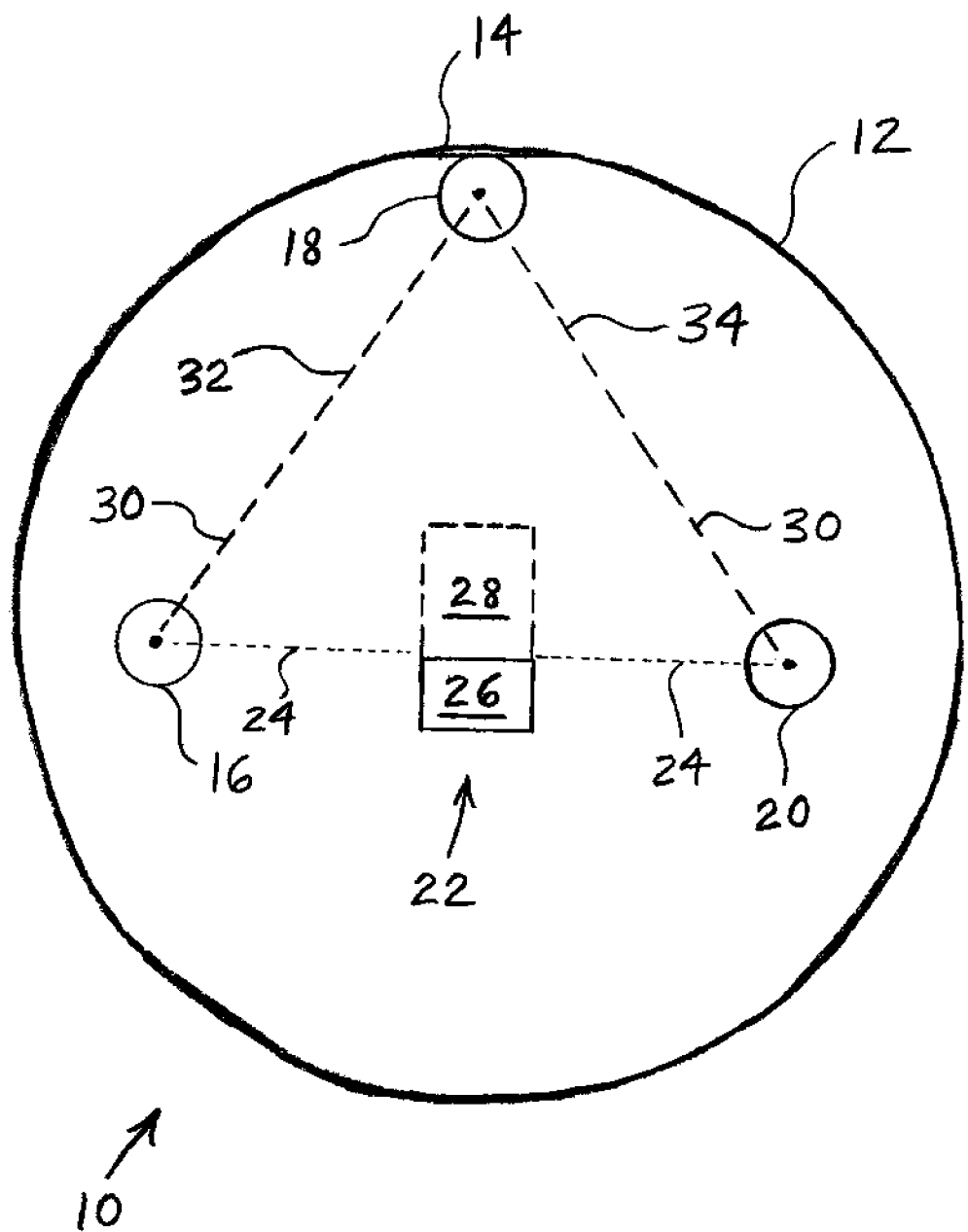
FIG. 1 is a schematic side view of one embodiment of a wireless network arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may be described herein in terms of algorithms and operations on data bits within a computer. It has proven convenient, primarily for reasons of common usage among those skilled in the art, to describe the invention in terms of algorithms and operations on data bits. It is to be understood, however, that these and similar terms are to be associated with appropriate physical elements, and are merely convenient labels applied to these physical elements. Unless otherwise stated herein, or apparent from the description, terms such as "calculating", "determining", "processing" or "computing", or similar terms, refer the actions of a computing device that may perform these actions automatically, i.e., without human intervention, after being programmed to do so.

The wireless network arrangement of the present invention, as deployed inside a vehicle, may achieve a level of reliability that is comparable to the reliability of known wired networks that are installed in cars. This reliability of the wireless network arrangement may be expressed as a bit error rate (BER) equivalent to the BER of a wired Controller Area Network (CAN) inside a car.

The reliability of a wireless channel may be dependent on the relative placement of the transmitter and receiver. According to the wireless network arrangement of the present invention, wireless nodes may be placed in locations so as to achieve better transmission and reception reliability than that of a typical wireless network.

The BER of a wired CAN network may be dependent on the environment, although to much lesser extent than is a wireless network. The BER of a CAN link may be about $3.1 \times 10^{-9}$ in a normal environment. However, the acceptable BER threshold for safety-critical applications is generally below $10^{-9}$. While it is improbable that the BER of a wireless link can be better (i.e., fall below) the BER of a normal CAN, the BER of the wireless network arrangement of the present invention may match the BER of a normal CAN, albeit at the cost of small latency and/or an increased number of packet transmissions on the wireless link.

According to the invention, in order to provide a wireless channel that can match the BER reliability of a wired CAN link in a finite small number of channel transmissions, the relative placements of a transmitter node and a receiver node may be established so as to avoid signal paths that do not follow a linear line of sight between the transmitter node and the receiver node. Non-linear signal paths between nodes may result in multi-path fading, which may be detrimental to reliability. The relative placements of a transmitter node and a receiver node may also be established so as to avoid signal paths that intersect with obstructive human movement. Such human movement may cause slow fading of the signal, and human obstruction may attenuate the signal strength significantly.

According to the present invention, the sites for deployment and placement of wireless nodes for sensing and actuation are first determined. Second, appropriate sites for placement of "intermediate" nodes are determined such that the intermediate nodes provide reliable links to some or all of other deployed nodes. In one embodiment, one or more intermediate wireless nodes are placed on the inner or downward-facing surface of the vehicle's overhead roof over the passenger compartment. Third, multi-hop paths are used to reach end nodes through "intermediate" nodes such that the reliability of the total multi-hop path is at least as good as the reliability of a wired CAN network. According to the invention, the "vision" between wireless nodes may be a direct line-of-sight, and may be unobstructed by human movement.

Referring now to the drawings and particularly to FIG. 1, there is shown one embodiment of a wireless network arrangement 10 of the present invention. Network arrangement 10 includes a schematically-illustrated enclosure 12 having a roof 14. Although enclosure 12 is shown to be circular in FIG. 1, enclosure 12 may be of any shape. For example, enclosure 12 may be in the form of a building, or a particular room or set of rooms within a building. As illustrated in further embodiments discussed below, the enclosure may also be in the form of a vehicle, such as an automobile, boat or airplane.

Within enclosure 12 are disposed three wireless electronic communication devices, or "nodes" as referred to herein, having reference numbers 16, 18 and 20. In addition to having wireless transmitters and/or receivers, nodes 16, 18, 20 may include portions, e.g., sensors, for producing information to be included in the content of the wireless communication. Nodes 16, 18, 20 may also include portions, e.g., actuators, for using or acting upon information carried in the received communication signals. Nodes 16, 18, 20 may be wirelessly and communicatively coupled to each other. Specifically, each of nodes 16, 18, 20 may be capable of engaging in two-way wireless communication with each of the other two nodes. In a particular embodiment, nodes 16, 18, 20 communicate in the radio frequency spectrum. However, it is also possible within the scope of the invention for nodes 16, 18, 20 to communicate via any other wireless means, such as sounds, optics, microwaves and/or infra-red signals, for example.

Each of nodes 16, 18, 20 may have a broadcast range that is greater than a diameter, width, or any other dimension of enclosure 12. That is, in the absence of any type of hindrance to wireless communication disposed between any two nodes, the two nodes may be able to reliably communicate with each other at a range of hundreds of feet. In contrast, the largest dimension of enclosure 12 may be in the range of five to about a hundred feet.

In the embodiment of FIG. 1, a hindrance to wireless communication 22 is disposed between, i.e. in the line-of-sight 24 between, nodes 16, 20. Hindrance 22 may include a fixed barrier 26 and a space 28 for accommodating a moveable barrier. Either or both of fixed barrier 26 and a moveable barrier accommodated by space 28 may impede, obstruct and/or block wireless communications between nodes 16 and 20. In a particular embodiment, fixed barrier 26 is in the form of a chair, and space 28 is the three-dimensional space generally above the chair that a person sitting in the chair would occupy. In another embodiment, fixed barrier 26 may be a wall, and space 28 may be the space defined by a door frame that is mounted in the wall. The space may accommodate a moveable barrier in the form of a hinged door that may swing between a closed position within the door frame and an open position in which the door is not within the door frame. The door, in the closed position, may impede or block wireless communication between opposite sides of the wall. Conversely, wireless communication may not be blocked or impeded by the space defined by the door frame when the door is in the open position, i.e., is not disposed in the door frame.

Despite nodes 16 and 20 not being able to communicate directly because of hindrance 22, nodes 16 and 20 may communicate indirectly via a third node 18. As can be seen in FIG. 1, no hindrance is intersected by a line-of-sight between nodes 16, 18, and no hindrance is intersected by a line-of-sight between nodes 18, 20. Node 18 may be attached to roof 14 of enclosure 12 in order to facilitate and/or provide clear lines-of-sight between node 18 and each of nodes 16, 20.

A wireless signal communication path 30 between nodes 16, 20, passing through node 18, may be exclusively formed by two joined linear segments 32, 34. Communication path 30 may wirelessly and communicatively couple node 16 to node 20 such that path 30 is non-intersecting with hindrance 22. Opposite ends of segment 32 are disposed at respective nodes 16, 18, and opposite ends of segment 34 are disposed at respective nodes 18, 20.

Any of nodes 16, 18, 20 may be a producer and/or a user of the information carried in the signals communicated amongst nodes 16, 18, 20. In one embodiment, however, node 18 is an intermediate node in the sense that node 18 neither produces nor uses the communicated information. That is, node 18 may be merely an intermediate node that is configured exclusively to relay wireless signals between nodes 16, 20.

Figure 2:
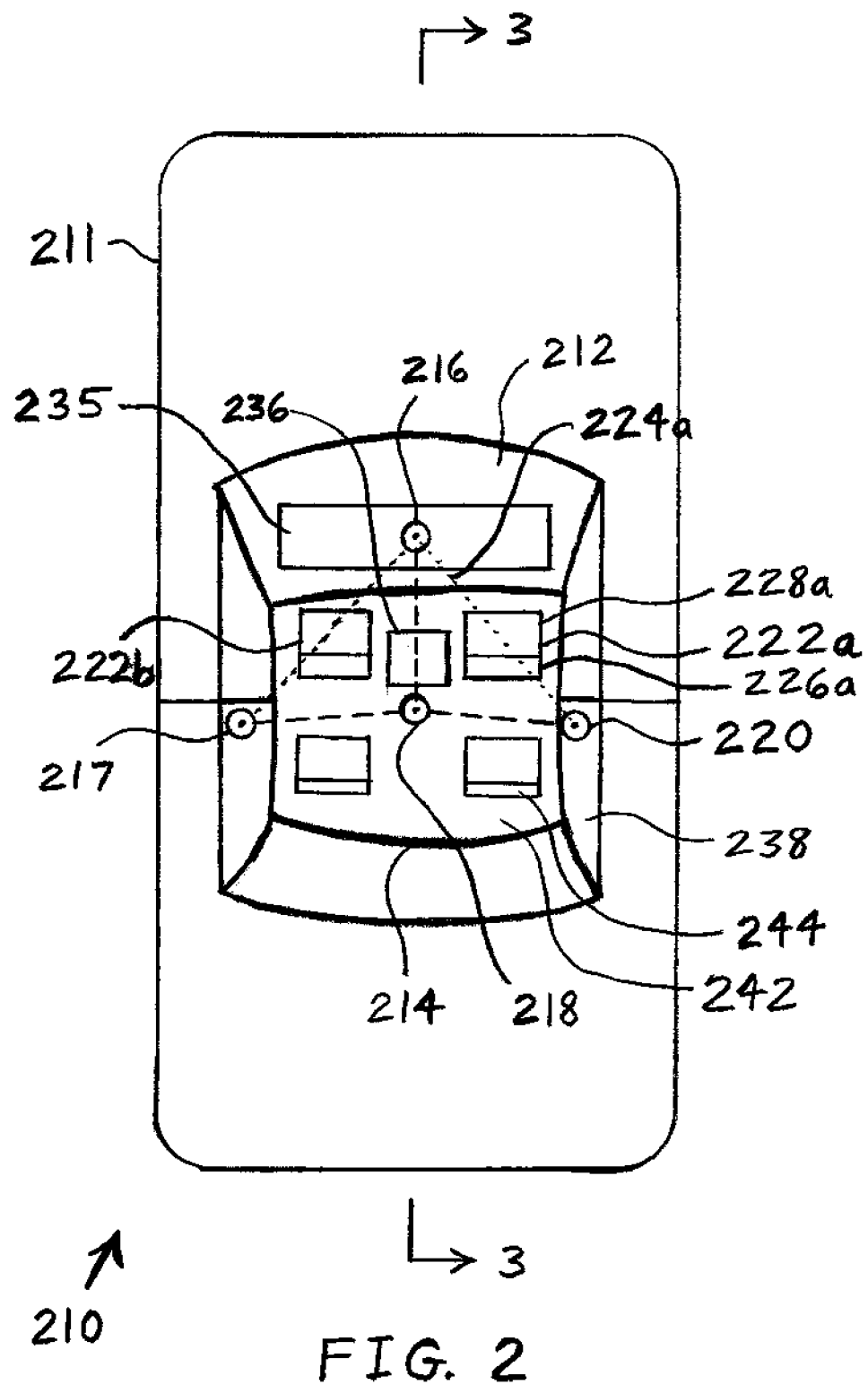
FIG. 2 is a schematic top view of one embodiment of a wireless automotive network arrangement of the present invention.

A wireless automotive network arrangement 210 of the present invention is illustrated in FIG. 2. Network arrangement 210 is disposed within an automobile 211 having a passenger compartment 212 with a roof 214. Within passenger compartment 212 are disposed four wireless electronic communication nodes 216, 217, 218 and 220. Nodes 216, 217, 218, 220 may be wirelessly and communicatively coupled to each other. Specifically, each of nodes 216, 217, 218, 220 may be capable of engaging in two-way wireless communication with each of the other three nodes. In a particular embodiment, nodes 216, 217, 218, 220 communicate in the radio frequency spectrum. However, it is also possible within the scope of the invention for nodes 216, 217, 218, 220 to communicate via any other wireless means, such as sounds, optics, microwaves and/or infra-red signals, for example.

Each of nodes 216, 217, 218, 220 may have a broadcast range that is greater than a width, length, or any other dimension of passenger compartment 212. That is, in the absence of any type of hindrance to wireless communication disposed between any two nodes, the two nodes may be able to reliably communicate with each other at a range of hundreds of feet. In contrast, the largest dimension of passenger compartment 212 may be in the range of about five to twelve feet.

Figure 3:
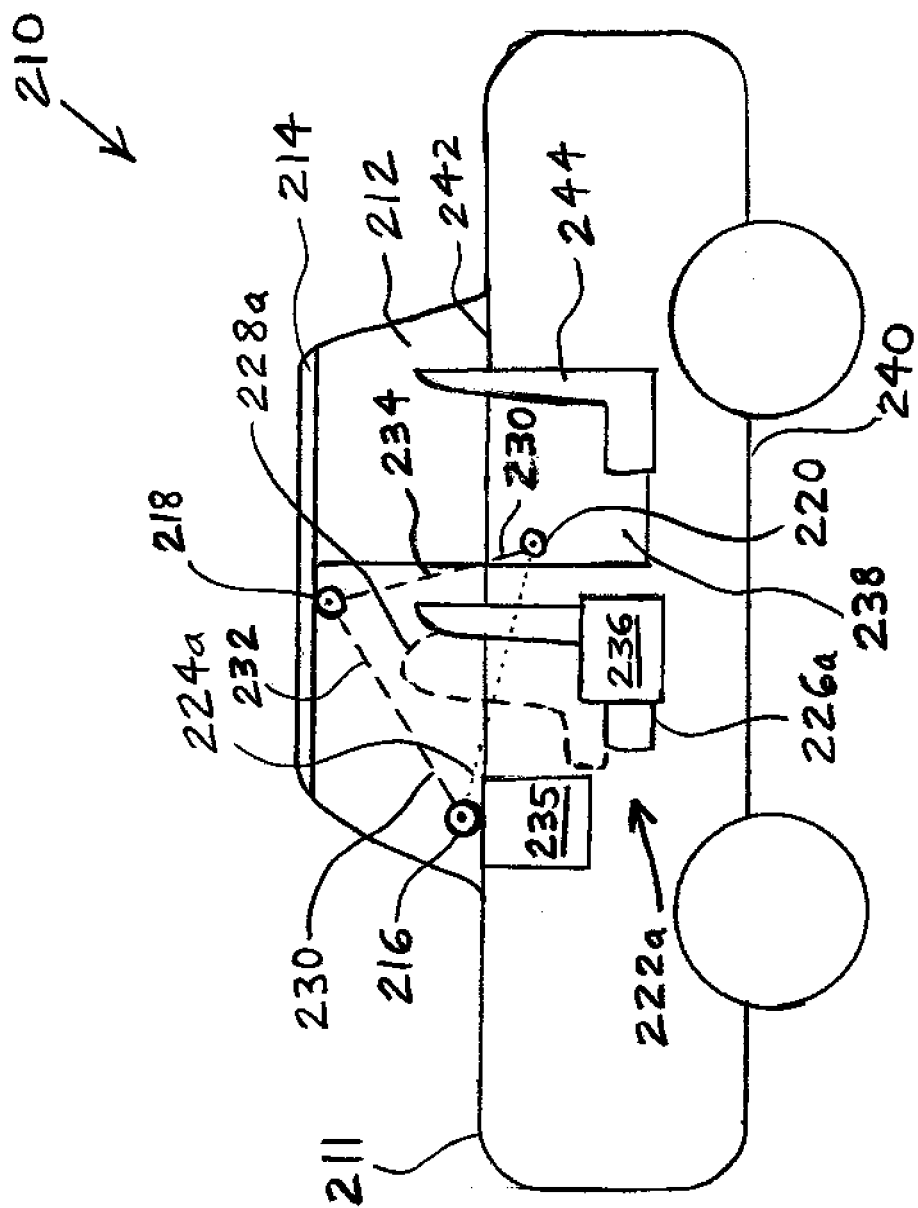
FIG. 3 is a schematic side view of the wireless automotive network arrangement of FIG. 2 along line 3-3.

In the embodiment of FIGS. 2 and 3, a hindrance to wireless communication 222*a* is disposed between, i.e. in the line-of-sight 224*a* between, nodes 216, 220. Hindrance 222*a* may include a fixed passenger seat 226*a* and a portion of space 228*a*, best shown in FIG. 3, for accommodating a human passenger who sits in seat 226*a*. Either or both of seat 226*a* and a passenger's body accommodated by space 228*a* may impede and/or block wireless communications between nodes 216 and 220.

Despite nodes 216 and 220 not being able to communicate directly because of hindrance 222*a*, nodes 216 and 220 may communicate indirectly via a third node 218. As can be best seen in FIG. 3, no hindrance is intersected by a line-of-sight between nodes 216, 218, and no hindrance is intersected by a line-of-sight between nodes 218, 220. Node 218 may be attached to roof 214 of passenger compartment 212 in order to facilitate and/or provide clear lines-of-sight between node 218 and each of nodes 216, 220. Node 216 may be mounted on an upper surface of dashboard 235 within passenger compartment 212. Node 220 may be mounted on an inner surface of a rear passenger side door 238. Alternatively, node 220 could be placed on another portion of passenger compartment 212, such as on floor 240.

A wireless signal communication path 230 between nodes 216, 220, passing through node 218, may be exclusively formed by two joined linear segments 232, 234 (FIG. 3). Communication path 230 may wirelessly and communicatively couple node 216 to node 220 such that path 230 is non-intersecting with hindrance 222a. Opposite ends of segment 232 are disposed at respective nodes 216, 218, and opposite ends of segment 234 are disposed at respective nodes 218, 220.

Similarly, wireless communication between nodes 216, 217 may be hindered by a hindrance in the form of a passenger seat 222b and/or a driver's body occupying a space generally above seat 222b. However, reliable wireless communication between nodes 216, 217 may be achieved via a wireless signal communication path formed of two joined linear segments and passing through node 218. A first linear segment has two opposite ends at respective nodes 216, 218, and a second linear segment has two opposite ends at respective nodes 217, 218. Other details of node 217 and its communication with nodes 216, 218 are substantially similar to those of node 220 as described above, and thus are not described herein to avoid needless repetition.

The communication path between nodes 216, 217 and the communication path between nodes 216, 220 have a linear segment in common, namely, the linear segment 232 having its opposite ends at nodes 216, 218. Thus, the communication path between nodes 216, 217 and the communication path between nodes 216, 220 partially overlie or coincide with each other.

Any of nodes 216, 217, 218, 220 may be a producer and/or a user of the information carried in the signals communicated amongst nodes 216, 217, 218, 220. In one embodiment, however, node 218 is an intermediate node in the sense that node 218 neither produces nor uses the communicated information. That is, node 218 may be merely an intermediate node that is configured exclusively to relay wireless signals between nodes 216, 217, 220.

Which, if any, objects and/or spaces form hindrances to wireless communication within passenger compartment 212 may depend upon the placement of the nodes within passenger compartment 212. For example, if node 220 were attached to floor 240 at a location behind console 236, then console 236 could provide a hindrance to wireless communication between nodes 216, 220. Alternatively, if node 220 were placed at location 242 behind a rear seat 244, then rear seat 244 and/or the body of a passenger sitting in seat 244 could provide a hindrance to wireless communication between nodes 216, 220.

Figure 4:
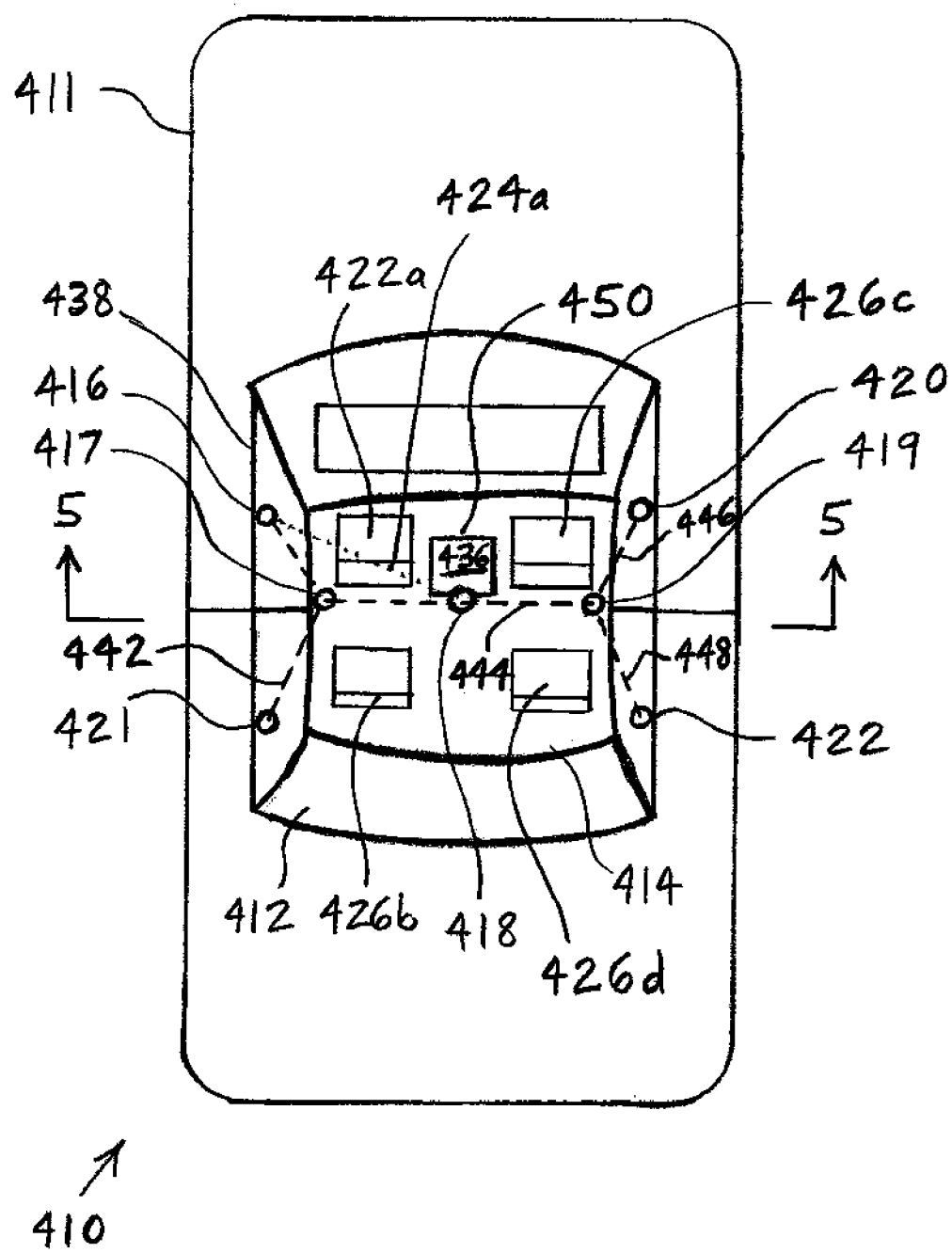
FIG. 4 is a schematic top view of another embodiment of a wireless automotive network arrangement of the present invention.

A wireless automotive network arrangement 410 of the present invention is illustrated in FIG. 4. Network arrangement 410 is disposed within an automobile 411 having a passenger compartment 412 with a roof 414. Within passenger compartment 412 are disposed seven wireless electronic communication nodes 416-422. Nodes 416-422 may be wirelessly and communicatively coupled to each other. Specifically, each of nodes 416-422 may be capable of engaging in two-way wireless communication with each of the other six nodes. In a particular embodiment, nodes 416-422 communicate in the radio frequency spectrum. However, it is also possible within the scope of the invention for nodes 416-422 to communicate via any other wireless means, such as sounds, optics, microwaves and/or infra-red signals, for example.

Each of nodes 416-422 may have a broadcast range that is greater than a width, length, or any other dimension of passenger compartment 422. That is, in the absence of any type of hindrance to wireless communication disposed between any two nodes, the two nodes may be able to reliably communicate with each other at a range of hundreds of feet. In contrast, the largest dimension of passenger compartment 412 may be in the range of about five to twelve feet.

Figure 5:
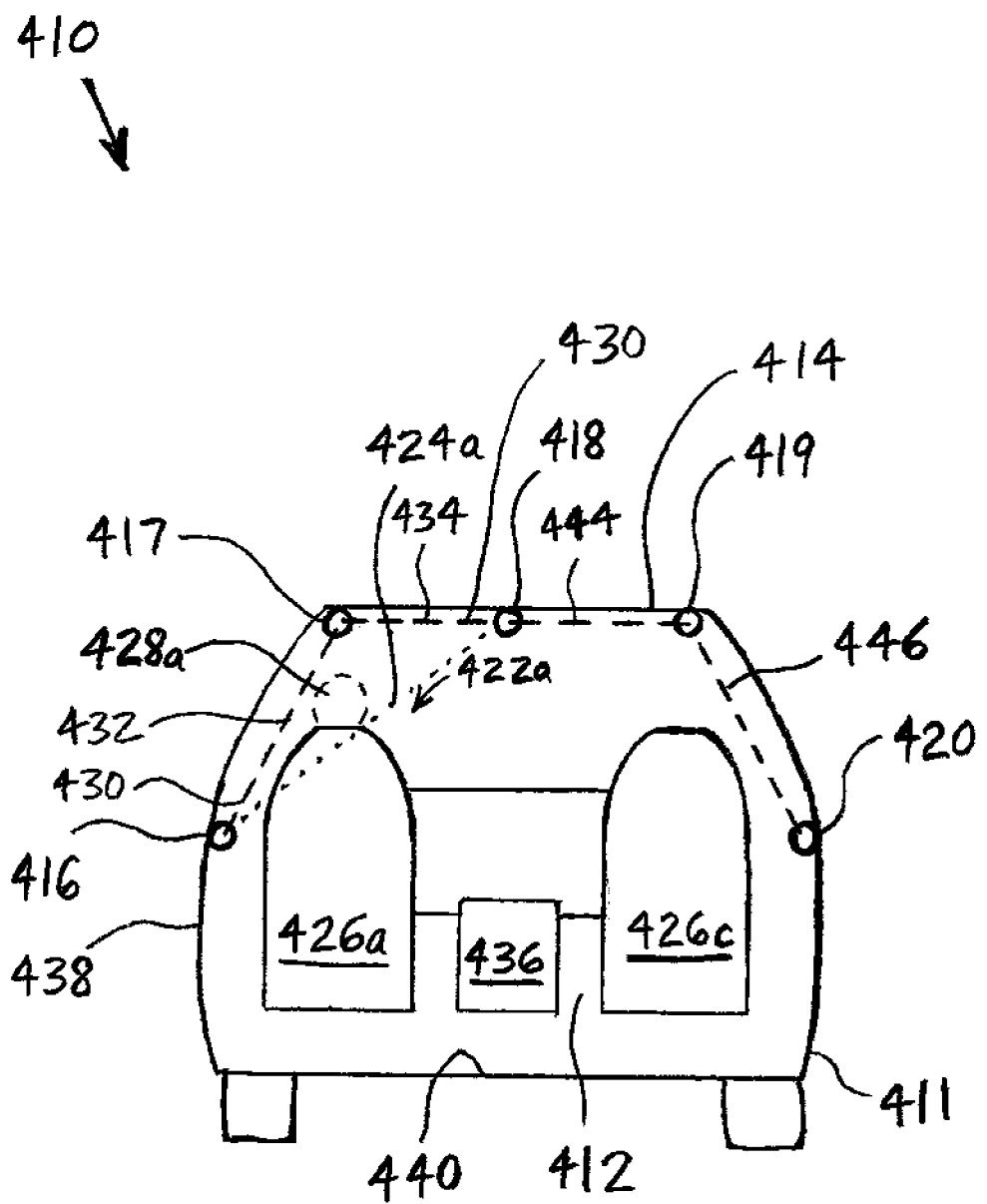
FIG. 5 is a schematic rear view of the wireless automotive network arrangement of FIG. 4 along line 5-5.

In the embodiment of FIGS. 4 and 5, a hindrance to wireless communication 422a is disposed between, i.e. in the line-of-sight 424a between, nodes 416, 418. Hindrance 422a may include a fixed passenger seat 426a and a portion of space 428a, partially shown in FIG. 5, for accommodating a human driver/passenger who sits in seat 426a. Either or both of seat 426a and a passenger's body accommodated by space 428a may impede and/or block wireless communications between nodes 416 and 418.

Despite nodes 416 and 418 not being able to communicate directly because of hindrance 422a, nodes 416 and 418 may communicate indirectly via a third node 417. As can be seen in FIGS. 4 and 5, no hindrance is intersected by a line-of-sight between nodes 416, 417, and no hindrance is intersected by a line-of-sight between nodes 417, 418. Node 417, as well as node 418, may be attached to roof 414 of passenger compartment 412 in order to facilitate and/or provide clear lines-of-sight between node 417 and each of nodes 416, 418. Node 416 may be mounted on an inner surface of a front driver side door 438. Alternatively, node 416 could be placed on another portion of passenger compartment 412, such as on floor 440.

A wireless signal communication path 430 between nodes 416, 418, passing through node 417, may be exclusively formed by two joined linear segments 432, 434. Communication path 430 may wirelessly and communicatively couple node 416 to node 418 such that path 430 is non-intersecting with hindrance 422a. Opposite ends of segment 432 are disposed at respective nodes 416, 417, and opposite ends of segment 434 are disposed at respective nodes 417, 418.

Similarly, wireless communication between nodes 421, 418 may be hindered by a hindrance in the form of a passenger seat 426b and/or a passenger's body occupying a space generally above seat 426b; wireless communication between nodes 420, 418 may be hindered by a hindrance in the form of a passenger seat 426c and/or a passenger's body occupying a space generally above seat 426c; and wireless communication between nodes 422, 418 may be hindered by a hindrance in the form of a passenger seat 426d and/or a passenger's body occupying a space generally above seat 426d. Wireless communication between other pairs of nodes may also be hindered by one or more hindrances. For example, wireless communication between nodes 416, 422 may be hindered by one or both of passenger seats 426a, 426d and/or passenger/driver bodies occupying the spaces generally above seats 426a, 426d; and wireless communication between nodes 420, 421 may be hindered by one or both of passenger seats 426b, 426c and/or passengers' bodies occupying the spaces generally above seats 426b, 426c However, in each of these cases, reliable wireless communication between the nodes may be achieved via a wireless signal communication path formed of a combination of two or more joined linear segments selected among segments 432, 434, 442, 444, 446 and 448. Opposite ends of segment 442 are disposed at respective nodes 421, 417; opposite ends of segment 444 are disposed at respective nodes 419, 418; opposite ends of segment 446 are disposed at respective nodes 420, 419; and opposite ends of segment 448 are disposed at respective nodes 419, 422. Other details of nodes 420-422 and their communications with, node 218 are substantially similar to those of node 416 as described above, and thus are not described herein to avoid needless repetition.

As is evident from the above descriptions and FIGS. 4 and 5, two or more of segments 432, 434, 442, 444, 446 and 448 may be combined to provide an unhindered and/or unobstructed wireless communication path between any two of nodes 416-422. The communication paths between either of nodes 416, 421 and either of nodes 420, 422 have at least two linear segments in common, namely, linear segments 434, 444. That is, the two communication paths between node 416 and nodes 420, 422, and the two communication paths between node 421 and nodes 420, 422 all have the same two linear segments 434, 444 in common. Thus, the two communication paths between node 416 and nodes 420, 422, and the two communication paths between node 421 and nodes 420, 422 partially overlie or coincide with each other.

Any of nodes 416-422 may be a producer and/or a user of the information carried in the signals communicated amongst nodes 416-422. In one embodiment, however, one, two or all three of nodes 417-419 may be intermediate nodes in the sense that such intermediate nodes neither produce nor use the communicated information. That is, such intermediate nodes may be configured solely and exclusively to relay wireless signals between nodes 416-422.

The objects and/or spaces that form hindrances to wireless communication within passenger compartment 412 may depend upon the placement of the nodes within passenger compartment 412. For example, if node 418 were attached to floor 440 at location 450 (FIG. 4), then console 436 could provide a hindrance to wireless communication between node 418 and any of nodes 417, 419, 421, 422. Further, seats 426a, 426c, and/or human bodies disposed in seats 426a, 426c, could provide a hindrance to wireless communication between node 418 and nodes 416, 420, respectively.

The present invention has been described herein as being applied to a reliable wireless network that is set up inside the cabin of a vehicle. However, it is to be understood that the same principles of using intermediate nodes for generating reliable channels can be applied in other areas of the car. Further, the present invention may be applied to non-automotive environments in which the use of wireless nodes would be advantageous, and in which obstructions to communication between the wireless nodes exist.

The use of the present invention is not limited to enclosures. For example, the present invention may be applied to outdoor spaces, e.g., a patio, porch or deck, where there exists a hindrance, e.g., a chair or a tree, to wireless communication.

While this invention has been described as having an exemplary design, the present invention may be further modified within the spirit and scope of this disclosure. This application is therefore intended to cover any variations, uses, or adaptations of the invention using its general principles.

What is claimed is:

1. A wireless network arrangement, comprising:
  a space including a hindrance to wireless communication; and
  at least three wireless electronic nodes wirelessly and communicatively coupled to each other, a broadcast range of the nodes being greater than a largest distance between any two of the nodes, the hindrance being disposed between a first one of the nodes and a second one of the nodes, the at least three nodes being positioned within the space such that a wireless signal communication path wirelessly and communicatively couples the first one of the nodes to the second one of the nodes, the communication path being non-intersecting with the hindrance, the communication path passing through at least a third one of the nodes, the communication path being formed exclusively of a plurality of joined linear segments, opposite ends of each linear segment being disposed at corresponding ones of the nodes.

2. The arrangement of claim 1 wherein the space comprises an outdoor space.

3. The arrangement of claim 1 wherein the broadcast range comprises a range within which each said node is capable of reliably communicating with another said node, the broadcast range being less than one thousand feet.

4. The arrangement of claim 1 further comprising a fourth one of the nodes, a second wireless signal communication path wirelessly and communicatively coupling one of the first node and the second node to the fourth node, the second communication path being non-intersecting with the hindrance, the second communication path passing through at least the third one of the nodes, the second communication path being formed exclusively of a plurality of joined linear segments, opposite ends of each linear segment being disposed at corresponding ones of the nodes.

5. The arrangement of claim 4 wherein the communication path coupling the first node to the second node comprises a first communication path, the second communication path partially overlying the first communication path, the arrangement further comprising a fifth one of the nodes, both the first communication path and the second communication path passing through the fifth node.

6. The arrangement of claim 1 wherein the third node comprises an intermediate node configured exclusively to relay wireless signals.

7. A wireless network arrangement, comprising:
  an outdoor space including a hindrance to wireless communication, the hindrance comprising at least one of a fixed barrier and a three-dimensional area configured to accommodate a moveable barrier; and
  at least three wireless electronic nodes wirelessly and communicatively coupled to each other, a broadcast range of the nodes being greater than a largest distance between any two of the nodes, the hindrance being disposed between a first one of the nodes and a second one of the nodes, the at least three nodes being positioned within the space such that a wireless signal communication path wirelessly and communicatively couples the first one of the nodes to the second one of the nodes, the communication path being non-intersecting with the hindrance, the communication path passing through at least a third one of the nodes, the communication path being formed exclusively of a plurality of joined linear segments, opposite ends of each linear segment being disposed at corresponding ones of the nodes.

8. The arrangement of claim 7 wherein the linear segments are joined together.

9. The arrangement of claim 7 wherein the fixed barrier comprises at least one of a chair and a tree.

10. The arrangement of claim 7 wherein the outdoor space comprises one of a patio, a porch, and a deck.

11. The arrangement of claim 7 further comprising a fourth one of the nodes, a second wireless signal communication path wirelessly and communicatively coupling one of the first node and the second node to the fourth node, the second communication path being non-intersecting with the hindrance, the second communication path passing through at least the third one of the nodes, the second communication path being formed exclusively of a plurality of joined linear segments, opposite ends of each linear segment being disposed at corresponding ones of the nodes.

12. The arrangement of claim 11 wherein the communication path coupling the first node to the second node comprises a first communication path, the second communication path and the first communication path having at least one of the linear segments in common.

13. The arrangement of claim 12, further comprising a fifth one of the nodes, both the first communication path and the second communication path passing through the fifth node.

14. A wireless network arrangement, comprising:
- an outdoor space including a hindrance to wireless communication; and
- at least three wireless electronic nodes wirelessly and communicatively coupled to each other, a broadcast range of the nodes being greater than a largest distance between any two of the nodes, the broadcast range being less than one thousand feet, the hindrance being disposed between a first one of the nodes and a second one of the nodes, the at least three nodes being positioned within the space such that a wireless signal communication path wirelessly and communicatively couples the first one of the nodes to the second one of the nodes, the communication path being non-intersecting with the hindrance, the communication path passing through at least a third one of the nodes, the communication path being formed exclusively of a plurality of joined linear segments, opposite ends of each linear segment being disposed at corresponding ones of the nodes.

15. The arrangement of claim 14 wherein the linear segments are joined together.

16. The arrangement of claim 14 further comprising a fourth one of the nodes, a second wireless signal communication path wirelessly and communicatively coupling at least one of the first node and the second node to the fourth node, the second communication path being non-intersecting with the hindrance, the second communication path passing through at least the third node, the second communication path being formed exclusively of a plurality of joined linear segments, opposite ends of each linear segment being disposed at corresponding ones of the nodes.

17. The arrangement of claim 16 wherein the communication path coupling the first node to the second node comprises a first communication path, the second communication path partially overlying the first communication path, the arrangement further comprising a fifth one of the nodes, both the first communication path and the second communication path passing through the fifth node.

18. The arrangement of claim 17 wherein the outdoor space comprises one of a patio, a porch, and a deck.

19. The arrangement of claim 1 wherein the hindrance comprises a three-dimensional area configured to accommodate a moveable barrier.

20. The arrangement of claim 19 wherein the three-dimensional area is configured to accommodate a living being.

* * * * *